United States Patent [19]
Gabel

[11] Patent Number: 4,802,703
[45] Date of Patent: Feb. 7, 1989

[54] TWEEZERS WITH AUTOMATIC OPENING AND CLOSING

[75] Inventor: Jean P. Gabel, La Wantzenau, France

[73] Assignee: Manufacture des Outils Dumont S.A., Montignez, Switzerland

[21] Appl. No.: 110,631

[22] Filed: Oct. 19, 1987

Related U.S. Application Data

[63] Continuation of Ser. No. 829,380, Feb. 13, 1986, abandoned.

[30] Foreign Application Priority Data

Feb. 20, 1985 [CH] Switzerland .......................... 777/85

[51] Int. Cl.[4] .............................................. B65G 7/12
[52] U.S. Cl. .................................................. 294/99.2
[58] Field of Search ....................... 294/99.2, 99.1, 16, 294/100; 128/354; D28/55

[56] References Cited

U.S. PATENT DOCUMENTS

| | | | |
|---|---|---|---|
| 1,108,299 | 8/1914 | Wisman | 294/99.2 |
| 2,876,778 | 3/1957 | Kees . | |
| 3,399,583 | 9/1968 | Hall . | |
| 4,303,268 | 12/1981 | Davidson | 294/99.2 |
| 4,389,912 | 6/1983 | Dallons et al. . | |
| 4,452,106 | 6/1984 | Tartaglia . | |

*Primary Examiner*—James B. Marbert
*Attorney, Agent, or Firm*—Pennie & Edmonds

[57] ABSTRACT

The tweezers (1) have a rigid closing ring (9) sliding without friction between the back end (5) of the tweezers, where the two legs of the tweezers are joined together, and the front (4) of the tweezers, where the tips (3) of the tweezers are located. Beyond the length over which it slides without friction, the ring (9) can slide further forward, overcoming friction and closing the tips (3) of the tweezers. It can also slide backwards beyond the frictionless length, until it either encounters a stop or experiences friction.

14 Claims, 3 Drawing Sheets

TWEEZERS WITH AUTOMATIC OPENING AND CLOSING

This is a continuation of application Ser. No. 829,380, filed Feb. 13, 1986, now abandoned.

SUMMARY OF THE INVENTION

The invention relates to tweezers with automatic opening and closing.

BACKGROUND OF THE INVENTION

Tweezers or pincers held in the hand enable an operator to take hold of a small object between the tips. The legs of the tweezers are generally flexible and transmit, to the tips gripping the object, part of the compression force applied by the hand to the legs of the tweezers. In general, the tips are apart in the rest position, except in the case of negative-action tweezers, whose legs are crossed and whose tips open under the action of compression of the legs by the hand.

It is frequently desirable for the gripped object to remain held between the tips of the tweezers without the operator having to exert pressure on the legs. This can currently be achieved only by negative-action tweezers and tweezers equipped with a rubber or leather closing ring. Movement of this ring over the outside of the tweezers, which is generally conical in shape, makes it possible to close the tips or allow them to take up their usual position, i.e. open or closed, according to the pressure applied by the hand; the operator uses his other hand to move this leather or rubber ring.

THE INVENTION

The object of the invention is to indicate a solution whereby tweezers held in one hand can be opened or closed without the help of the other hand, thus avoiding the solution provided by negative-action tweezers, which have a limited closing force.

The tweezers according to the invention achieve this object and are designed accordingly as indicated in claim 1.

BRIEF DESCRIPTION OF THE DRAWINGS

To provide a clearer understanding of the invention, several embodiments thereof will be described by way of examples, with reference to figures in which.

PREFERRED EMBODIMENTS OF THE INVENTION

Figure 1:
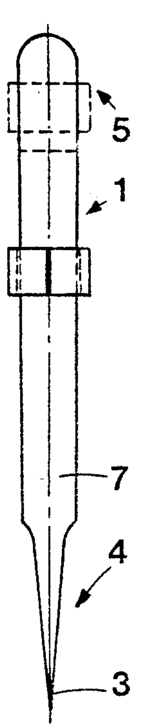
FIGS. 1 and 2 show a first embodiment of tweezers according to the invention in front and side views respectively.
Figure 2:
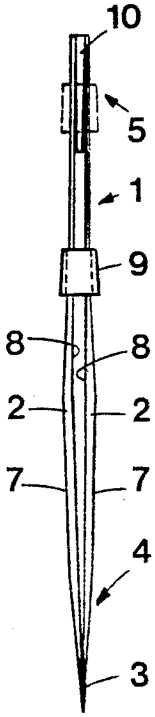

FIGS. 1 and 2 show the usual form of tweezers 1 with two identical legs 2 joined together by their inner faces 8 at their back ends 5. The hand encircles the tweezers and squeezes or releases the outer faces 7 of the legs 2 when the tweezers are being used, the closing pressure applied by the hand generally being exerted in the middle of the legs or slightly forward of the middle. The side view shows that the legs 2 are curved to enable the legs to act elastically on the tips 3 without the legs touching at the middle.

A rigid ring 9 can slide freely, without friction, over a certain length provided in the back half of the tweezers.

Figure 3:
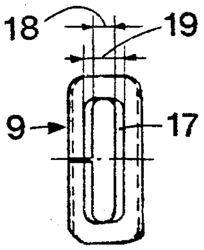
FIG. 3 shows a closing ring.

At the front end of this frictionless length, the space between the curved legs 2 is such that the ring 9 starts to rub against the outer faces 7 of the legs 2, the friction increasing as the ring moves forward. FIG. 3 shows that the inner faces 17 of the hole in the ring, which bear against the outer faces 7 of the legs 2, can have a conicity, and this conicity can be identical to that of the outer faces 7 of the curved legs 2 at the point where the ring experiences friction and becomes blocked in its forward movement.

A variety of means exerting friction on the ring can be provided at the point where the frictionless length of the ring 9 comes to an end near the back 5 of the tweezers. In a first embodiment, shown in FIGS. 1 and 2, the space between the outer faces 7 of the legs reaches a minimum and then increases again slightly, right at the back end, due to the insertion of a conical spacer 10 between the joined back ends of the legs 2. As the ring 9 is moved towards the back end, friction will start to develop with the diverging outer faces 7 and will rapidly increase.

The tweezers are opened and closed with the ring in the following manner:

After he has taken hold of the object to be gripped between the tips, the operator holds the tweezers vertically and the ring falls under its own weight to the front end of the frictionless length and stops slightly beyond it on the conicity of the tweezers. A slight pressure applied by the fingers to the legs of the tweezers ensures that the sliding ring becomes blocked, the ring falling a further one or two mm; this makes it possible to hold an object tightly between the tips with no risk of losing it.

To release the grip, it is necessary only to point the tips upwards and exert a slight pressure on the two legs of the tweezers so as to close the gap between the legs at the point where the ring has stopped; the sliding ring returns under its own weight to its initial position near the back end.

In the initial position near the back end, it is possible to make the friction for the ring 9 so small that, as soon as the tweezers are vertical with the tips pointing down, the ring can leave this position under its own weight. The elastic legs can also be made with a curved shape at the back end, this shape being designed so that the friction on the ring in its back position is greatly reduced, or even eliminated, when the operator squeezes the center parts of the legs together, enabling the ring to move under its own weight (solution not shown). Another possibility is to hold the pincers between the thumb and the middle finger and use the index finger to push the ring away from the back length, where there is friction, thus enabling it to drop into its front, blocked position.

Figure 4:
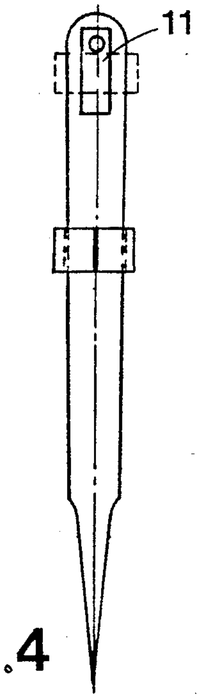
FIGS. 4 and 5 show a second embodiment of tweezers according to the invention in front and side views respectively.
Figure 5:
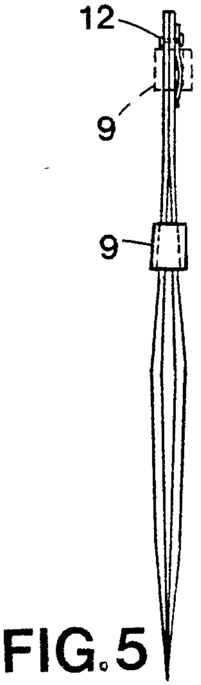

In a second embodiment, shown in FIGS. 4 and 5, an elastic strip 11, fixed at one end by a rivet 12 to the outer face 7 at the back 5 of one leg of the tweezers, provides the desired friction and blocking of the ring 9 in its back position (broken line). This strip can serve as a clip when the tweezers are placed in a pocket (like a pen); it also serves as a hook enabling the tweezers to be hung on a string, for example in order to dry the object gripped between the tips.

Figure 6:
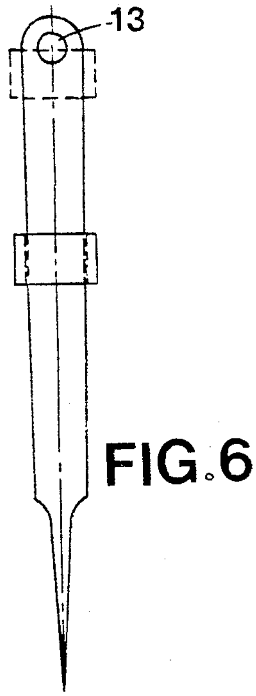
FIGS. 6 and 7 show a third embodiment of tweezers according to the invention in front and side views respectively.
Figure 7:
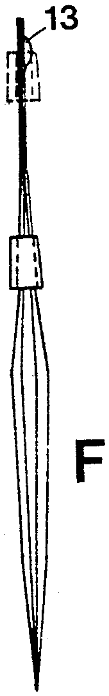

In a third embodiment, shown in FIGS. 6 and 7, a stamped flange 13 protrudes from the center of the outer face 7 at the back 5 of one leg of the tweezers.

Figure 8:
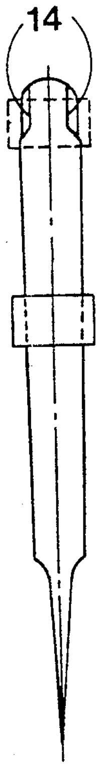
FIGS. 8 and 9 show a fourth embodiment of tweezers according to the invention in front and side views respectively.
Figure 9:
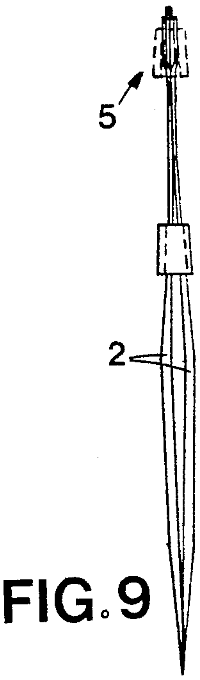

In a fourth embodiment, shown in FIGS. 8 and 9, the side edges of the back end of each leg 2 are spread slightly outwards by means of a stamped flange 14.

Figure 10:
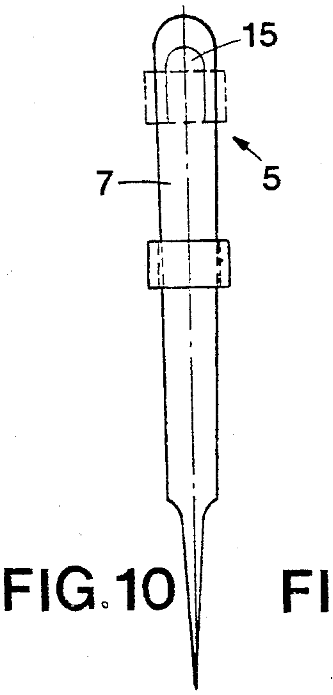
FIGS. 10 and 11 show a fifth embodiment of tweezers according to the invention in front and side views respectively.
Figure 11:
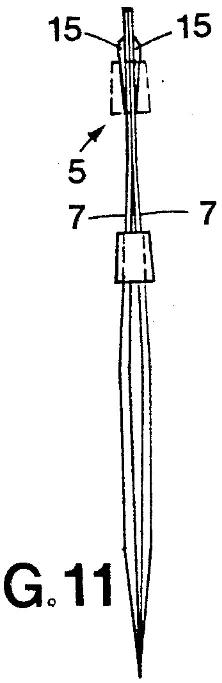

In a fifth embodiment, shown in FIGS. 10 and 11, a stamped flange 15 protrudes from the center of each outer face 7 at the back 5 of the legs of the tweezers.

Figure 12:
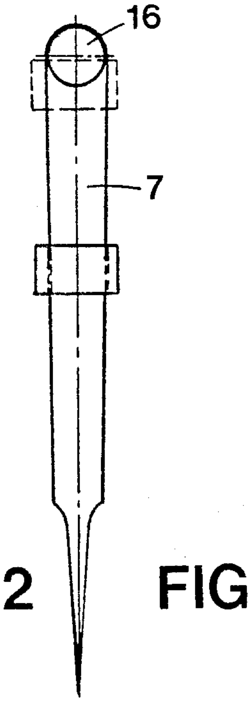
FIGS. 12 and 13 show a sixth embodiment of tweezers according to the invention in front and side views respectively.
Figure 13:
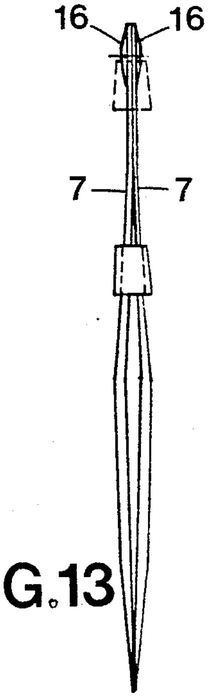

In a sixth embodiment, shown in FIGS. 12 and 13, a rivet 16, passing through the back ends 5 of the legs and joining them together, has heads which protrude slightly relative to the outer faces 7 of the legs 2 of the tweezers.

What is claimed is:

1. Tweezers, with automatic locking, comprising:

(a) two legs each having forward and back ends with tips at the forward ends and a middle portion spaced from the back end, the legs being joined together at the back ends and having a normal position biased away from each other in the middle portions and at the forward ends and tips with no intervening structure therebetween, the legs in the middle portion being adapted to be subjected to a closing pressure to move the legs in the middle portion toward each other so as to move the forward ends and tips to a closed position, said legs further having opposite outside faces extending therealong from the back ends to the forward ends;

(b) a rigid closing ring having opposite internal faces spaced from each other by a predetermined distance and freely and slidably mounted on said legs for sliding movement without friction and under the influence of gravity between said back ends and the middle portion thereof, with said opposite internal faces opposing and moving along the opposite outside faces of the legs; and (c) the spacing of the outside faces in said middle portion of the legs when in said normal position being greater than the predetermined spacing of the internal faces of said ring to frictionally retard movement of said ring therealong and said spacing of the outside faces being less than said predetermined spacing with the outside surfaces of the legs spaced from the opposed inside surfaces of the ring when said closing pressure is applied to permit the ring to slide under the influence of gravity toward the tips and over at least part of the middle portion of said legs and thereby hold said tips closed upon release of said closing pressure by frictional retainment of said ring on the middle portion of said legs and to further permit free sliding movement away from the forward ends under the influence of gravity upon exerting a sufficient closing pressure to space the outside faces of the legs directly underlying the ring at a distance from each other which is less than said predetermined spacing with the outside surfaces of the legs spaced from the opposed inside surfaces of the ring; and (d) stop means at the back ends of the legs to stop movement of the ring in a direction toward the back ends.

2. Tweezers as claimed in claim 1 wherein:

(a) the spacing of the legs in the middle portion is progressively greater as measured in a direction toward the forward ends to progressively and increasingly frictionally retard movement of the ring therealong toward the forward ends of the legs.

3. Tweezers as claimed in claim 2 wherein:

(a) the spacing of the opposite internal faces of the ring is progressively greater as is mesaured in a direction toward the forward ends of the legs and generally the same as that of the outside faces of the middle portion of said legs.

4. Tweezers as claimed in claim 3 wherein:

(a) the stop means at the back ends of the legs includes means extending over a length of the arms for frictionally stopping movement of said ring toward said back ends.

5. The tweezers as claimed in claim 4, wherein the length where there is friction at the back ends is produced by a conical spacer (10) placed between the two legs (2) at the point where they rejoined together, the thicker part of the spacer being at the back ends.

6. The tweezers as claimed in claim 4, wherein the length where there is friction at the back ends is produced by a spring strip (11) fixed flat against one outer face (7) at the back (5) of the tweezers, the fixing means (12) for the strip being placed near that end of the strip which is near the back (5) of the tweezers.

7. The tweezers as claimed in claim 4, wherein the length where there is friction at the back ends is produced by a thick part (13-15) protruding from at least one of the outer faces (7) of the legs (2) at the back end (5) of the tweezers, the inner faces (8) of the legs (2) being joined directly together at their back end (5).

8. the tweezers as claimed in claim 7, wherein the thick part has a centrally stamped flange (13) at the back end (5) of at least one of the legs (2), the stamped part protruding outwards.

9. The tweezers as claimed in claim 7, wherein the thick part has a flat head rivet (16) holding the back ends (5) of the legs (2) together and protruding from at least one of the outer faces (7) of the back ends (5) of the legs.

10. The tweezers as claimed in claim 7, wherein the thick part has two lateral stamped flanges (14) at the back end (5) of at least one of the legs (2), the stamped parts protruding outwards.

11. The tweezers as claimed in claim 7, wherein the thick part has centrally stamped flanges (15) at the back end (5) of at least one of the legs (2), the stamped parts protruding outwards.

12. Tweezers (1) with automatic opening and closing, which have a rigid closing ring (9) surrounding and sliding without friction over a first length of the tweezers, said first length being spaced inwardly from said ring and extending between the back end (5) of the tweezers, where the two legs of the tweezers are joined together, and the middle portion of the tweezers on which the closing pressure is exerted, the tips (3) of the tweezers being located at the forward end of the legs, second and third lengths disposed along the tweezers and extending from both ends of said first length, the second length extending toward the middle portion and the third length extending toward the back end, the ring (9) being slidable further forward from said first length and over said second length and overcoming friction and ensuring that the tips (3) of the tweezers are closed, and such that, as it moves over the third length towards the back it encounters a stop, at least one of the lengths over which the ring slides with friction towards the front and over which it slides with friction towards the back, producing friction which continues to increase as from the point adjacent to the frictionless length, where friction is first experienced and wherein, at least over part of the lengths where there is friction, at the middle and the back of the tweezers, the friction can be reduced by squeezing the legs (2) of the tweezers together.

13. The tweezers as claimed in claim 12, wherein stops (10–15) are located at the middle portion and the back ends of the lengths where there is friction, which are at the middle and the back of the tweezers.

14. The tweezers as claimed in claim 13, wherein the hole in the closing ring (9) is rectangular in shape and the short side (18, 19) of the hole is smaller on the back side (18) of the ring than on the front side (19) of the ring.

* * * * *